Jan. 16, 1945.   E. L. MALHIOT   2,367,513
TESTING APPARATUS
Filed May 30, 1942        3 Sheets-Sheet 1

INVENTOR
E. L. MALHIOT
BY Harry C. Duft
ATTORNEY

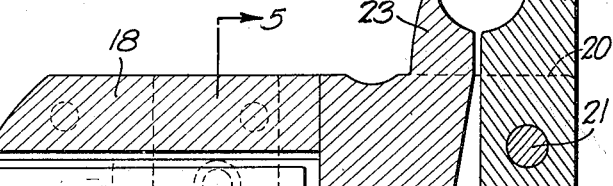
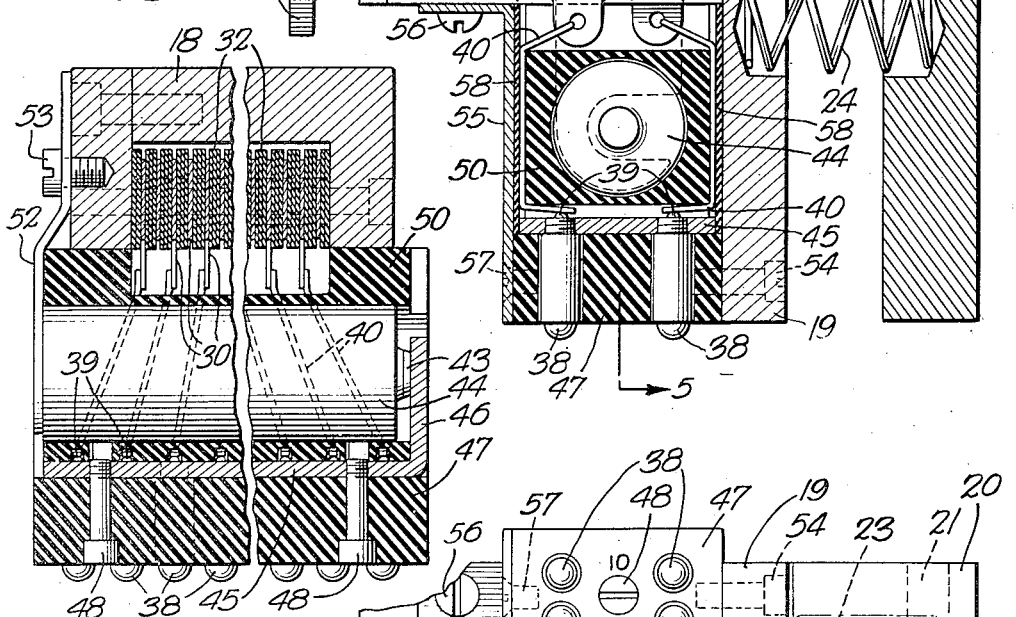
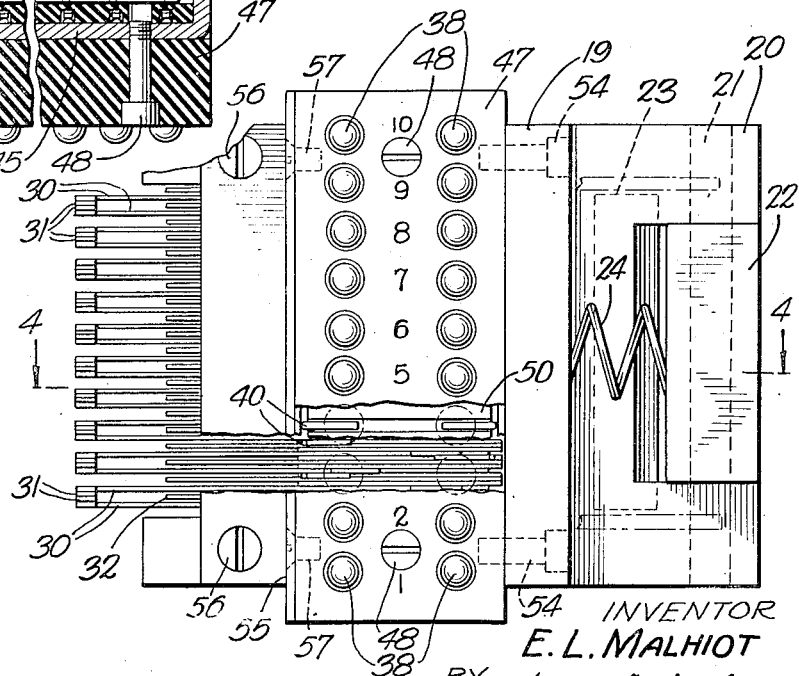

Jan. 16, 1945. E. L. MALHIOT 2,367,513
TESTING APPARATUS
Filed May 30, 1942 3 Sheets-Sheet 3
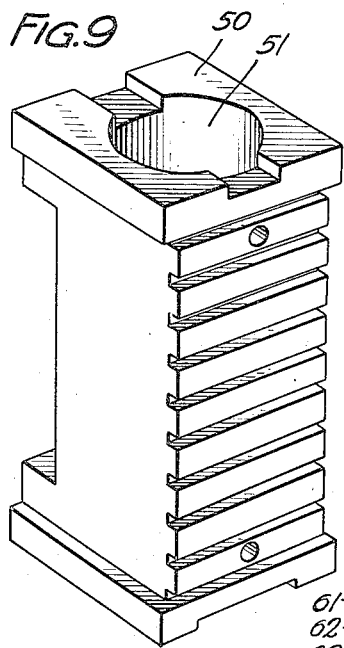
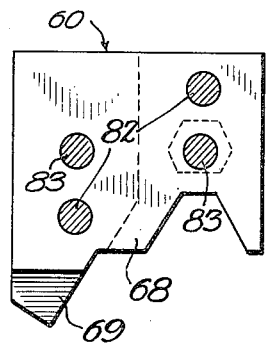
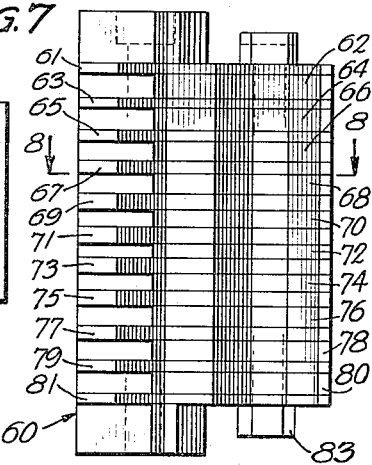
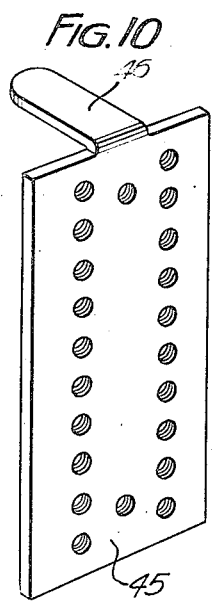
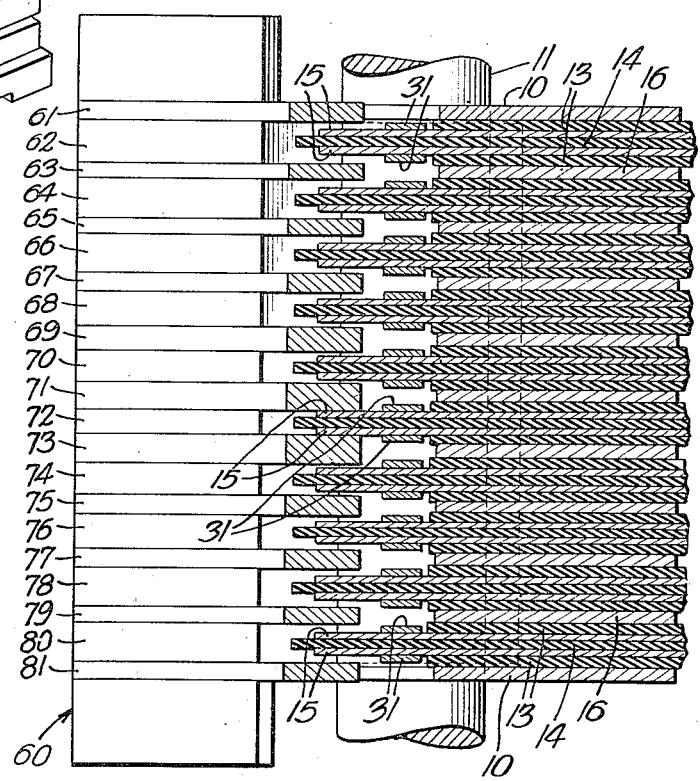
INVENTOR
E. L. MALHIOT
BY Harry L. Duft
ATTORNEY Patented Jan. 16, 1945

2,367,513

UNITED STATES PATENT OFFICE 2,367,513

TESTING APPARATUS

Eugene L. Malhiot, Maywood, Ill., assignor to Western Electric Company, Incorporated, New York, N. Y., a corporation of New York Application May 30, 1942, Serial No. 445,245

10 Claims. (Cl. 33—174)

This invention relates to testing apparatus, and more particularly to testing apparatus for checking the spacing of elements in electrical apparatus.

In the manufacture of some types of apparatus, and more particularly in the assembling of elements of step-by-step banks used in telephone equipment, it may be desirable to check the spacing of the assembled elements. Since these elements may be very close to each other and since it may be desirable in some cases to hold the spacing within very close tolerances, considerable difficulty may be experienced in some cases in accurately checking the spacing of the elements with testing devices commonly used for such purposes.

It is an object of the present invention to provide a simple and effective testing apparatus for checking the spacing of elements in electrical apparatus.

In accordance with one embodiment of the invention, testing apparatus is provided having a plurality of electrical contacts for engaging the terminals on the levels of a step-by-step bank assembly, the apparatus being provided with a number of indicating lamps, one lamp being associated with each contact. A gauge is also provided as a part of the testing apparatus, and is inserted between the levels of the bank assembly. This gauge is constructed to engage the terminals on one level of the assembly and thereby to complete a circuit to the corresponding lamps. If any other level is improperly spaced with respect to this level, the gauge will also engage it and cause a corresponding lamp to be lit, thus indicating the defectively spaced level.

Other objects and advantages of the present invention will be apparent from the following detailed description considered in connection with the following drawings, wherein:

Fig. 3 is a plan view of the apparatus shown in Fig. 1, the scale being slightly reduced;

Fig. 4 is a horizontal section along the line 4—4 of Fig. 3;

Fig. 5 is a vertical section along the line 5—5 of Fig. 4;

Fig. 6 is an enlarged fragmentary sectional view along the line 6—6 of Fig. 1, showing the gauge block in testing position on the bank assembly;

Fig. 7 is a detail view of the gauge block;

Fig. 8 is a vertical section along the line 8—8 of Fig. 7;

Fig. 9 is a detail perspective view of the battery block; and

Fig. 10 is a detail perspective view of the lamp holder.

Figure 1:
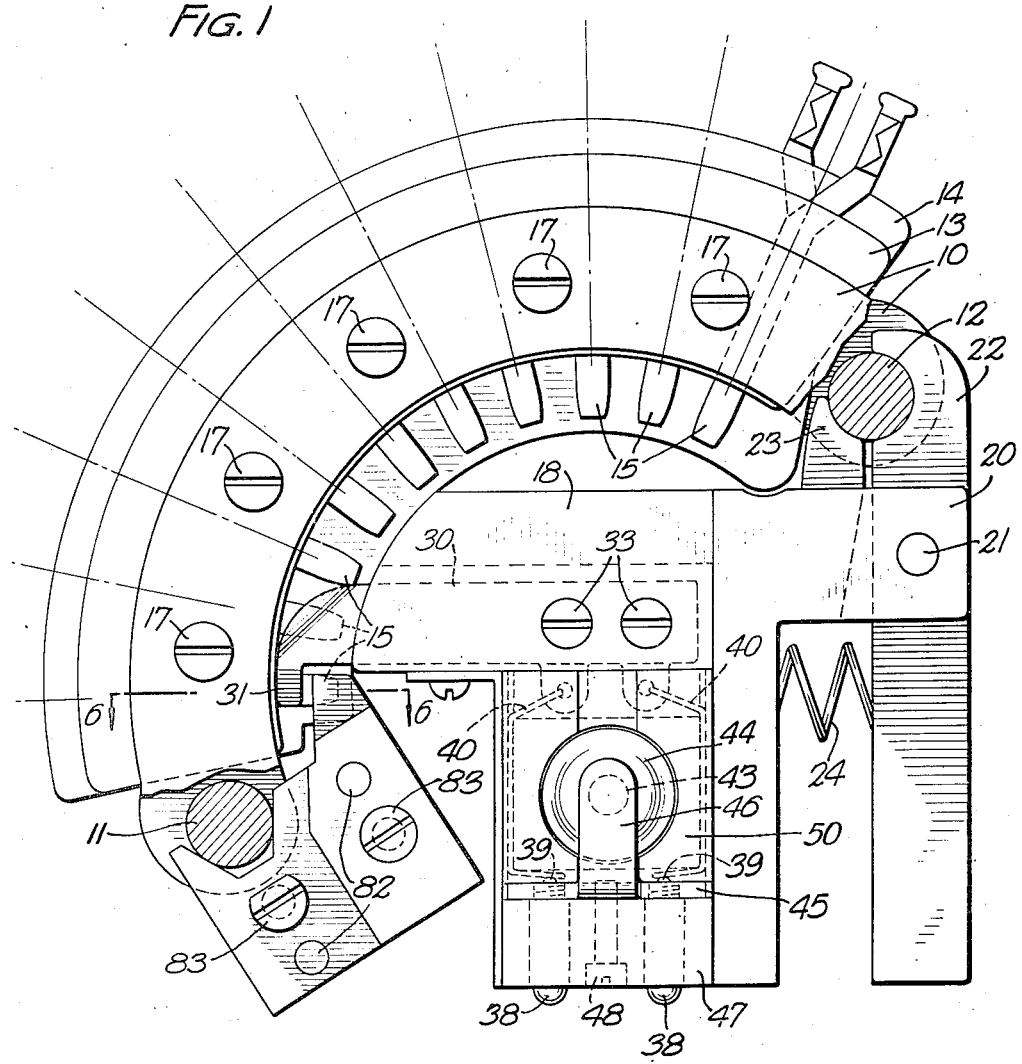
Fig. 1 shows, in side elevation, a testing apparatus for a step-by-step bank assembly, the apparatus being in testing position.

Referring now to the drawings, Fig. 1 shows a testing apparatus constructed in accordance with one embodiment of this invention in operating position on a step-by-step bank assembly such as used in some types of telephone equipment. This assembly comprises a number of levels, ten commonly being used. A curved metal plate 10 is provided at either end as a frame and is apertured near its ends to receive rods 11 and 12 which support the assembly in the telephone equipment with which it is intended to be used. A similarly curved strip 13 of insulating material is positioned against the plate 10 and a second strip 14 of insulating material is positioned against this strip and provided with a number of pairs of terminal contacts 15, one member of each pair being positioned on either side of the strips. Each level comprises a strip 14 provided with terminal contacts on either side and two insulating strips 13. As shown in Fig. 6, the levels are spaced from each other by spacers 16 positioned therebetween. These spacers may also be made of an insulating material such as phenolized canvas. The assembly is held together by a number of rivets 17.

The testing apparatus comprises two cooperating parts, an indicating device and a gauge. The indicating device has a housing comprising a base 18 and a side member 19 set at right angles thereto. The side member 19 is provided with a projecting member 20 near its midpoint which serves as a support for a pivot 21 on which is mounted a clamp 22 which engages the rod 12 on the bank assembly. A projecting portion 23 at one end of the side member 19 also engages the rod 12 and thus cooperates with the clamp 22 in providing a pivotal support for the indicating device. A spring 24 holds the clamp against the rod.

Figure 2:
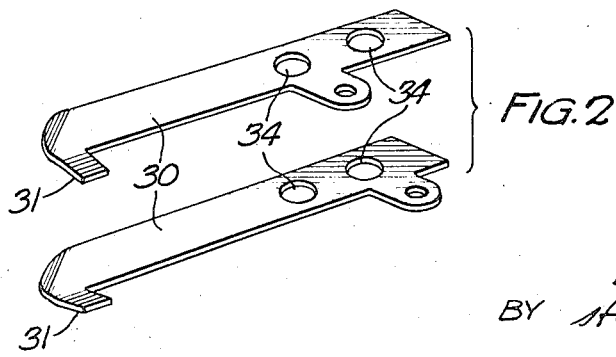
Fig. 2 is a detail perspective view showing a pair of contacts used in the testing apparatus.

In using this indicating device, the operator presses the clamp 22 to open it, places the device on the bank assembly, and permits the clamp to engage the rod 12. He then pivots the device to cause a number of spring contacts 30, mounted thereon, to engage one row of the terminal contacts 15, as shown in Figs. 1 and 6. These spring contacts, shown in detail in Fig. 2, are substantially flat strips of metal and are paired, each member of each pair having an end portion 31 slightly bent toward the other, and one pair of contacts being provided for each level to be tested. The contacts are insulated and spaced from each other except at their ends by strips 32 of insulating material and are mounted in the housing by a number of bolts 33, which pass through the apertures 34 in the contacts.

Each spring contact has associated therewith a small switchboard type lamp 38 and is connected to a terminal 39 on the base of the lamp by a connector 40. A second terminal for each lamp is formed by the side of the lamp and is connected to a terminal 43 on a battery 44 by a plate 45 of conducting material, shown in detail in Fig. 10, into which the lamps are screwed. A bent fingerlike portion 46 contacts the battery terminal 43. The battery may be a standard small one-and-one-half volt flashlight battery. A block 47 of wood, or other similar material, having apertures therein to receive the lamps, is mounted on the plate 45 by screws 48 and protects the lamps, it being thick enough to permit only the tips of the lamps to be exposed. Each pair of apertures, of which there are ten, is designated by a number from 1 to 10 on the block 47, as shown in Fig. 3, the numbers corresponding with the levels on the step-by-step bank assembly to be engaged by the spring contacts associated with the lamps. The battery is positioned in a block 50 composed of material similar to the block 47 and having a battery receiving aperture 51, as shown in Fig. 9. A strip 52 of conducting material cooperates with the projecting portion 46 of the plate 45 to hold the battery in place in the block and at the same time connects the second terminal of the battery to the metal housing of the indicating device through a retaining screw 53.

The battery, battery block, lamp holder and lamps are fixed in the L-shaped portion formed by the base 18 and side member 19 of the indicator housing, as shown in Figs. 1 and 4, by a pair of screws 54 which pass through the member 19 and engage the block 47. A bracket plate 55 is attached to the base 18 of the housing by a pair of screws 56 and to the block 47 by a second pair of screws 57. The connectors 40, which pass around either side of the battery block, are prevented from contacting the side member 19 or the bracket plate 55 by strips 58 of insulating material, as shown in Fig. 4.

Having placed the indicating device on the step-by-step bank assembly so that one row of terminals of the ten levels are contacted by the tips 31 of the spring contacts 30, as shown in Figs. 1 and 6, the operator then places a gauge block 60 in position on the other bank assembly supporting rod 11. This gauge block comprises a series of laminations 61—81 of conducting material of varying size and thickness, as shown in Figs. 6 and 7, alternate laminations projecting to form members capable of being inserted between the levels of the bank assembly. The laminations which are inserted between the levels are designated by the odd numbers from 61 to 81, inclusive, while the laminations which serve as spacers are designated by even numbers from 62 to 80, inclusive. The laminations are held together by a number of rivets 82 and bolts 83. Laminations 69 and 71 are designed to engage the two terminals on the fifth level of the step-by-step bank assembly in this embodiment of the invention, thus using that level as a reference point. No contact with the terminals of the other levels is made unless the levels are improperly spaced with respect to the fifth level.

When the laminations 69 and 71 engage the terminal contacts on the fifth level of the bank assembly, as shown in Fig. 6, a circuit is completed from the base terminals 39 of those lamps, designated by the number 5 on the block 47, which are connected to the fifth level spring contacts by the conducting members 40, through the gauge block to the metal rod 11, through the metal plate 10 on which the rod 11 rests, to the rod 12 which is contacted by the projecting member 20 of the indicator housing side member, and then to the battery 44 through the strip 52 which engages the rear of the battery, then through the battery and through the projection 46 to the side terminal of the lamps which is contacted by the lamp holder 45 thereon which engages the other terminal of the battery, thus lighting these lamps. If any other levels are contacted by the gauge, a similar circuit to a corresponding lamp or lamps will be completed, thus indicating the defect in spacing.

If the allowable tolerance in spacing be $\frac{1}{1000}$ of an inch, it will be apparent that using the fifth level as a reference point the other levels in both directions will be progressively less precisely spaced. For example, using a tolerance of $\frac{1}{1000}$ of an inch, if the fifth level is properly spaced, and sixth or fourth level $\frac{1}{1000}$ of an inch off, then if the variation of $\frac{1}{1000}$ be repeated on the seventh and third levels, a cumulative error of $\frac{2}{1000}$ is involved. Following this reasoning, the eighth and second levels may have a cumulative error in spacing of $\frac{3}{1000}$ and the ninth and first levels $\frac{4}{1000}$. Thus, the spacing of the contact laminations of the gauge block is not the same but progressively greater for each contact lamination away from the fifth level contact laminations to allow for the cumulative error in the spacing of the levels of the step-by-step bank assembly. The projecting laminations are correspondingly thinner, thus providing greater tolerances in either direction from the mid point, or fifth level.

This testing apparatus thus combines a mechanical gauge and electrical indicating device in one apparatus, thus making it possible for an operator readily and accurately to check the spacing of elements in a step-by-step assembly. While testing apparatus has been illustrated and described for testing a ten level step-by-step bank assembly, it will be understood that the apparatus may be modified and altered so as to be used in testing spacing in any similar multi-contact assembly without departing from the spirit or scope of the present invention.

What is claimed is:

1. An apparatus for testing spacing of elements in electrical equipment comprising conducting means for engaging said elements, indicating means associated with said conducting means, and gauging means of conducting material for normally contacting one of said elements, said gauging means being adapted to contact other elements if the other elements are improperly spaced to complete a circuit to said indicating means and to cause said indicating means to indicate the contact.

2. An apparatus for testing spacing of elements in electrical equipment comprising conducting means for engaging said elements, indicating means associated with said conducting means, gauging means for contacting one of said elements and for contacting other improperly spaced elements, and said indicating means being responsive to contact being made with said elements through said gauging means.

3. An apparatus for testing spacing of elements in electrical equipment comprising indicating means corresponding to each element, conducting means associated with said indicating means for contacting said elements, and cooperating means for selectively contacting one of said elements to cause said indicating means to operate, said cooperating means also contacting other improperly spaced elements to cause a corresponding indicating means to operate.

4. An apparatus for testing contacts in a multi-level electrical bank assembly comprising means for engaging said contacts, electrical indicating means associated with said engaging means, a source of current for said indicating means, means for normally contacting one level of said bank assembly and for completing a circuit to said indicating means to cause said indicating means to operate, said contacting means being designed to contact other levels if the other levels are improperly spaced with respect to said level to cause the indicating means to indicate such contacts.

5. An apparatus for testing spacing of contacts in a multi-level electrical bank assembly comprising a gauge block for selectively engaging levels of said assembly, a multi-lamp indicating device in conductive relation to said levels of said bank assembly, one lamp corresponding to each level, and means for causing a corresponding lamp to light upon a level being contacted by the gauge block.

6. An apparatus for testing spacing of contacts in a multi-level electrical bank assembly comprising a gauge block for selectively engaging levels of said assembly, said block comprising a series of projecting members, means for spacing said members, said spacing means being progressively thicker in either direction from the middle spacing means in said block and said projecting members being proportionately thinner progressively in either direction from the middle projections on said block, a multi-lamp indicating device in conductive relation to said levels of said bank assembly, one lamp corresponding to each level and means for causing a corresponding lamp to light upon a level being contacted by the gauge block.

7. An apparatus for testing spacing of contacts in a multi-level electrical bank assembly comprising a gauge block for selectively engaging levels of said assembly, said block comprising a series of projecting members and means for spacing said members, said spacing means being progressively thicker in either direction from the middle spacing means in the block, said projecting members being proportionately and progressively thinner from the middle projections on said block, a multi-lamp indicating device in conductive relation to said levels, said device being provided with a number of spring contacts which engage said levels, and means for causing a corresponding lamp to light upon a level being contacted by the gauge block.

8. An apparatus for checking the spacing of levels in a step-by-step bank assembly comprising an indicating device, said device being provided with a number of lamps corresponding to the levels on the bank assembly, a source of current connected to one terminal of said lamps, conducting means for connecting the other terminal of said lamps to the terminals on one row of levels of the bank assembly, gauging means of conducting material adapted to be positioned on the bank assembly so that contact is made with the terminals on one level of the assembly and with such other levels as are improperly spaced, and said gauging means completing a circuit through said bank assembly to cause lamps corresponding to the engaged level or levels to light.

9. An apparatus for checking spacing of elements in a multi-level electrical assembly comprising a gauge block for selectively engaging one level of said assembly and such other levels as are improperly spaced, indicating means corresponding to the levels of the assembly, contacting means of conducting material associated with said indicating means for engaging the levels of the assembly and connecting the indicating means thereto, said contacting means comprising a flexible substantially flat member, the end which contacts the level being slightly bent at an angle thereto so as to facilitate engagement therewith, and means for causing an indicating means corresponding to the level or levels contacted by the guage block to operate upon being contacted by the gauge block.

10. An apparatus for checking the spacing of levels in a step-by-step bank assembly comprising an indicating device, conducting means for clamping said indicating device to said bank assembly, said device being provided with a number of lamps corresponding to the levels on the bank assembly, a source of current connected to one terminal of said lamps, conducting means for connecting the other terminal of said lamps to the terminals of one row of levels on the bank assembly, gauging means of conducting material adapted to be positioned on the bank assembly so that contact is made with the terminals on one level of the assembly and with such other levels as are improperly spaced, and said gauging means completing a circuit through said bank assembly to cause lamps corresponding to the engaged level or levels to light.

EUGENE L. MALHIOT.